March 7, 1972 — E. C. PETERSON — 3,647,667
SEWAGE TREATMENT

Filed June 11, 1970 — 2 Sheets-Sheet 1

INVENTOR
EARL C. PETERSON

BY
ATTORNEY

March 7, 1972  E. C. PETERSON  3,647,667
SEWAGE TREATMENT

Filed June 11, 1970  2 Sheets-Sheet 2

INVENTOR
EARL C. PETERSON
BY Orrin M. Haugen
ATTORNEY

United States Patent Office 3,647,667
Patented Mar. 7, 1972

---

3,647,667
SEWAGE TREATMENT
Earl C. Peterson, 1300 Kelly Drive N.,
Minneapolis, Minn. 55427
Filed June 11, 1970, Ser. No. 45,319
Int. Cl. B01d *13/02;* B01k *5/00;* C02b *1/82*
U.S. Cl. 204—299        7 Claims

ABSTRACT OF THE DISCLOSURE

Means of dispersing aqueous effluents from a sewage treatment system utilizing a generally closed septic or retention tank and a subterranean disposal field area. The septic tank is arrange to receive raw sewage and to retain solids and discharge aqueous fluid effluent therefrom. The disposal field is normally disposed adjacent the septic tank vessel and is arranged to receive and disperse the aqueous fluid effluent discharged from the septic tank. Electrode means are provided for electrolytically treating the aqueous effluent by the application of a DC electrical field through the effluent, the electrode means including an expendable anode situated in the disposal field at a point adjacent the septic tank vessel, and a generally non-expendable cathode situated in the disposal field at a point remote from the septic tank vessel and anode, the electrode means being electrolytically coupled, one to another.

BACKGROUND OF THE INVENTION

Sewage treatment systems utilized in private family dwellings which are not served by municipal or other sewage treatment facilities conventionally or normally employ a treatment system including a closed septic tank vessel which receives raw sewage from the dwelling unit, this septic tank vessel retaining the solids, and discharging aqueous fluid effluent into a disposal field which is arranged adjacent the septic tank vessel. Certain installations utilize a dry-well type of disposal field, and others may employ a drain field. The selection of disposal field will normally be determined by the type of drainage, the soil conditions, the topography, and certain other considerations.

The rate of discharge of fluid effluent from the disposal area is normally dependent upon the soil condition, as well as the effective area of the field. For given soil conditions and given disposal field areas, it has been determined that discharge of effluent may be accelerated when electrolytic treatment means are employed in the system. While the function is not entirely clear or understood, it appears that the system functions by virtue of electroosmosis. Electrode means including a cathode and an anode preferably prepared from dissimilar materials are arranged within the disposal field and are electrolytically coupled, one to another. It is believed that the electrical field generated by virtue of these electrodes assists and enhances the ultimate discharge or drainage of the fluid effluent from the disposal field proper.

When a disposal field consists of coarse gravel, sand, or the like, rates of discharge of aqueous fluid effluent is normally not a problem. However, when dense soils including clay, gumbo, or the like are found, the discharge of aqueous fluid effluent proceeds at a somewhat slower rate. Clay particles are normally composed of thin crystals, the crystals being in the form of atomic sheets. When clay particles are dry, the substance is normally electrically neutral. However, when moistened, clay particles have been found to develop a negative electrical charge. Since water is a bi-polar substance, the positive poles of the water molecule will adhere to the negatively charged particle, thus forming a shield or sheath of water molecules around the particle. In typical fashion, additional water molecules are held in a second layer or sheath by the exposed negatively charged poles of the first layer. These electrical forces holding or retaining the water molecules in contact with the clay gradually decrease with distance from the clay particle until effectively diminished or lost. The net result is an immobile layer of water surrounding each particle of clay, the immobile layers being surrounded in turn by free water. The amount of free water present in the system will depend upon the available spaces between individual clay particles. In highly dense clay soils, the capillarity can be extremely small, and voids are substantially non-existent.

By utilizing a pair of dissimilar electrodes, one forming an anode, the other forming a cathode, with the electrodes being electrolytically coupled, one to another, the field generated has been found to cause more rapid dispersal of aqueous fluid in a disposal field, and accordingly a more rapid rate of discharge of effluent from the disposal field proper.

SUMMARY OF THE INVENTION

Briefly, in accordance with the present invention, a sewage treatment system is provided which consists of a closed septic tank and a disposal field, the septic tank being arranged to receive raw sewage and to retain solids and discharge aqueous fluid effluent therefrom. The disposal field, which is disposed adjacent the septic tank vessel, receives the aqueous effluent and in order to more effectively distribute the effluent within the area of the field, electrode means including an expendable anode and a non-expendable cathode are provided within or across the boundaries of the field. The anode is disposed adjacent the point at which effluent enters the field, and the cathode is disposed at a point remote from the initial entry site, as well as being remote from the anode. The cathode, being non-expendable, is preferably comprised of carbon, such as graphitic or granular carbon, while the anode is fabricated from a metallic substance which has a place in the electromotive force series (EMF) which is above hydrogen. Most metals, including iron, aluminum, zinc, and the like are positioned above hydrogen (platinum) in the EMF series of elements, and may be utilized for this purpose. As indicated, the anodes are expendable and are, of course, consumed during the active life of the system.

Therefore, it is an object of the present invention to provide an improved means for treating aqueous effluents from a sewage treatment system, the means including the provision of a pair of dissimilar electrodes including an expendable anode and a non-expendable cathode, these electrodes being arranged in the disposal field in electrolytically coupled relationship, and in remotely disposed relationship, one to another.

It is yet a further object of the present invention to provide an improved means for dispersing aqueous effluent from a sewage treatment system which includes the provision of a pair of electrode means in a disposal field, the electrode means including an expendable anode situated in the disposal field adjacent the discharge point from the septic tank vessel, and a non-expendable cathode disposed remotely from the septic tank vessel and anode.

It is yet a further object of the present invention to provide an improved means for dispersing aqueous effluents from sewage treatment systems including electrode means with a generally non-expendable cathode disposed or situated in a disposal field, along with an expendable anode situated in the disposal field, the anode being selected from those elements having a point above hydrogen (platinum) in the EMF series of elements, with the cathode preferably being carbon.

Other and further objects of the present invention will become apparent to those skilled in the art upon a study of the following specification, appended claims, and accompanying drawings.

DESCRIPTION OF THE PREFERRED MODIFICATION

Figure 1:
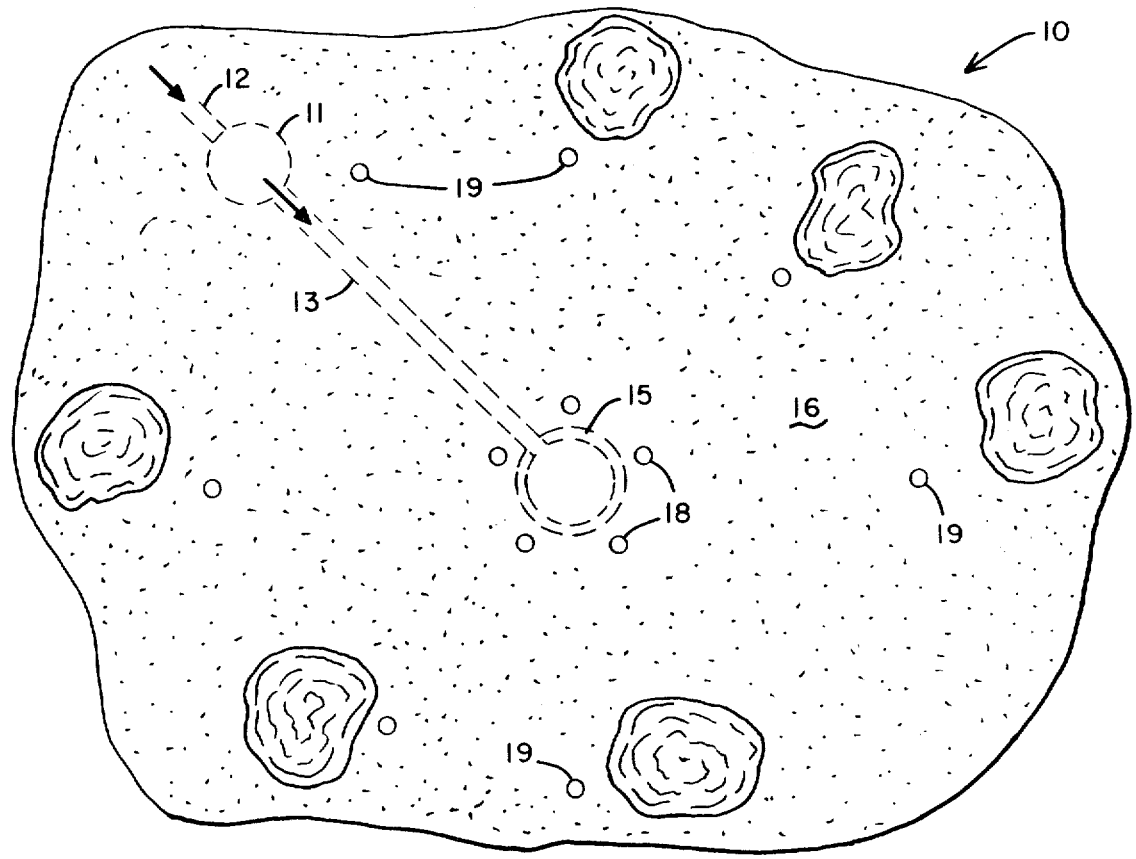
FIG. 1 is a plan view of a typical sewage treatment system prepared in accordance with the preferred modification of the present invention.
Figure 2:
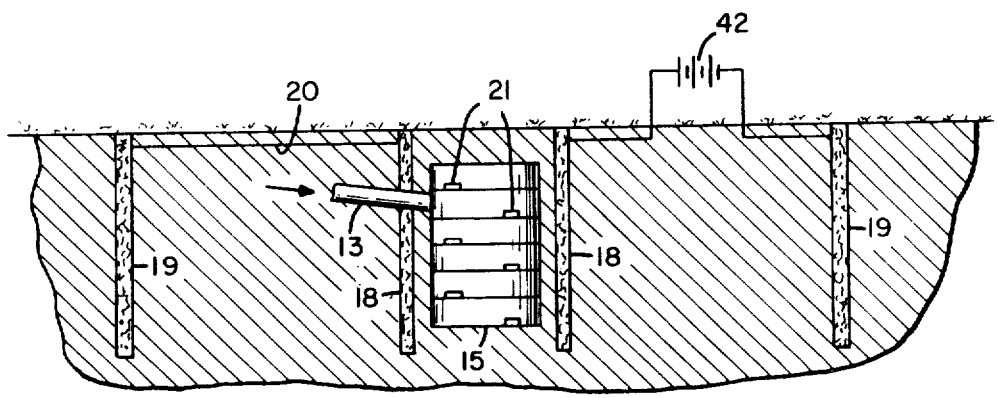
FIG. 2 is a vertical sectional view of the system shown in FIG. 1, the sectional view being a subterranean view.

With particular attention being directed to FIG. 1 of the drawings, in accordance with the modification of the invention as illustrated in FIGS. 1 and 2, the system generally designated 10 includes a closed septic tank vessel 11, having an inlet line 12 and an outlet line 13 extending therefrom, line 13 discharging effluent from tank 11 into the dry-well member 15 disposed within the confines of the disposal area 16. The disposal area 16 is provided with a plurality of bores which are loaded with dissimilar materials so as to provide an electrolytic means therewithin. The bores adjacent the dry-well member 15 such as at 18—18, provide a place for retention of the expendable anode material, while the bores as at 19—19, provide a point for disposition of the non-expendable cathodes. As has been indicated, ground scrap iron or the like provides an inexpensive and convenient anode, while a mixture of coke, carbon, and graphite provides a desirable non-expendable cathode. While not entirely essential in each instance, a conductor member such as the conductors 20—20 may be employed to complete the electrolytic coupling between the anode and cathode members respectively.

No unusual materials of construction are required for the system, and a conventional inlet line 12, fabricated from asbestos transite material, cast iron, clay soil pipe, or the like may be employed. Preferably septic tank vessel 11 is intact, and confines the material therewithin, and may be fabricated from either steel, cast iron, or concrete. For most purposes, modern systems employ a concrete block structure for this component of the system. Line 13, which carries the discharge of the effluent from the septic tank vessel 11 to the dry-well 15 may be fabricated from either transite flue, cast iron, or soil pipe, while dry-well member 15 is preferably fabricated from concrete blocks or the like. As is indicated in FIG. 2, the concrete blocks utilized to fabricate dry-well 15 have a number of openings formed in the side walls thereof, such as at 21—21 to permit discharge of the effluent.

As has been indicated, when effluent enters the tank 15, it is held only for the length of time required for seepage to occur from the confines of the dry-well. Upon leaving the confines of the dry-well 15, the effluent enters the disposal field and is immediately placed within the influence of the electrolytic cell established adjacent the periphery of the system. For practical purposes, the material leaving the confines of dry-well 15 can be considered as being discharged from the septic tank vessel, and hence the dry-well 15 merely acts as a buffer storage element for fluids discharged from the septic tank vessel 11. Upon entering the disposal field, and coming within the influence of the electrolytic field established thereacross, the fluids have been found to be more readily and quickly dispersed, and more readily and completely found within the entire confines of the disposal field.

In one typical installation, where completion of the electrolytic cell is required, an electrically conductive cable is extended between each anode-cathode pair. In certain instances, it may be desirable to electrolytically couple a single anode with a number of cathodes, if desirable.

In preparing the individual electrodes, the non-expendable cathodes may be prepared from merely filling a bore with crushed coke, carbon particles, or the like. It has been found that a 7-inch augered bore having a 1½ inch pipe extending therethrough, may be initially filled with crushed coke, and thereafter, the pipe is filled with graphite particles, and slowly removed while the graphite is forced into the volume of space left upon removal of the pipe. The anode is preferably filled with pieces of scrap iron or the like which is readily available. The individual pieces of scrap iron should, preferably, be sufficiently small so as to permit close contact between the individual particles, and thereby increase the effective surface area of the electrolytic cell.

In certain instances, it may be desirable to impress an electrical field across the anode and cathode respectively, and thus free oxygen may be provided in the anode area. Septic tank effluents normally have a pH of about 6, and thus will contain sufficient electrolyte to permit conduction between the points of the cell. Also, nascent oxygen may be generated at the anode, thereby enhancing the breakdown of the effluent as it moves adjacent this area. If this occurs, the pH of the effluent may drop slightly due to the combination of the oxygen with dissolved organic products involving the production of $CO_2$, along with the consequent increase in hydrogen ion concentration.

When aerobic and anaerobic soils are adjoining, there is a normal tendency for electrical currents to flow from the anaerobic section through the soils and to the aerobic sections. This flow of current is felt to be due to a difference in oxygen concentrations in the anaerobic and aerobic soils. The flow of an electrolytic current generated by the system of the present invention is believed to assist in the enhancement of discharge area. Also, the action of anaerobic and aerobic sulfate-reducing bacteria may have a beneficial effect in the generation of electrical currents in the overall electrolytic systems.

As has been previously indicated, the precise theoretical explanation of the mechanism is not entirely understood or appreciated, however the practical application of the concept has been found beneficial in those typical home sewage treatment systems including a closed septic tank vessel and a disposal field.

Figure 3:
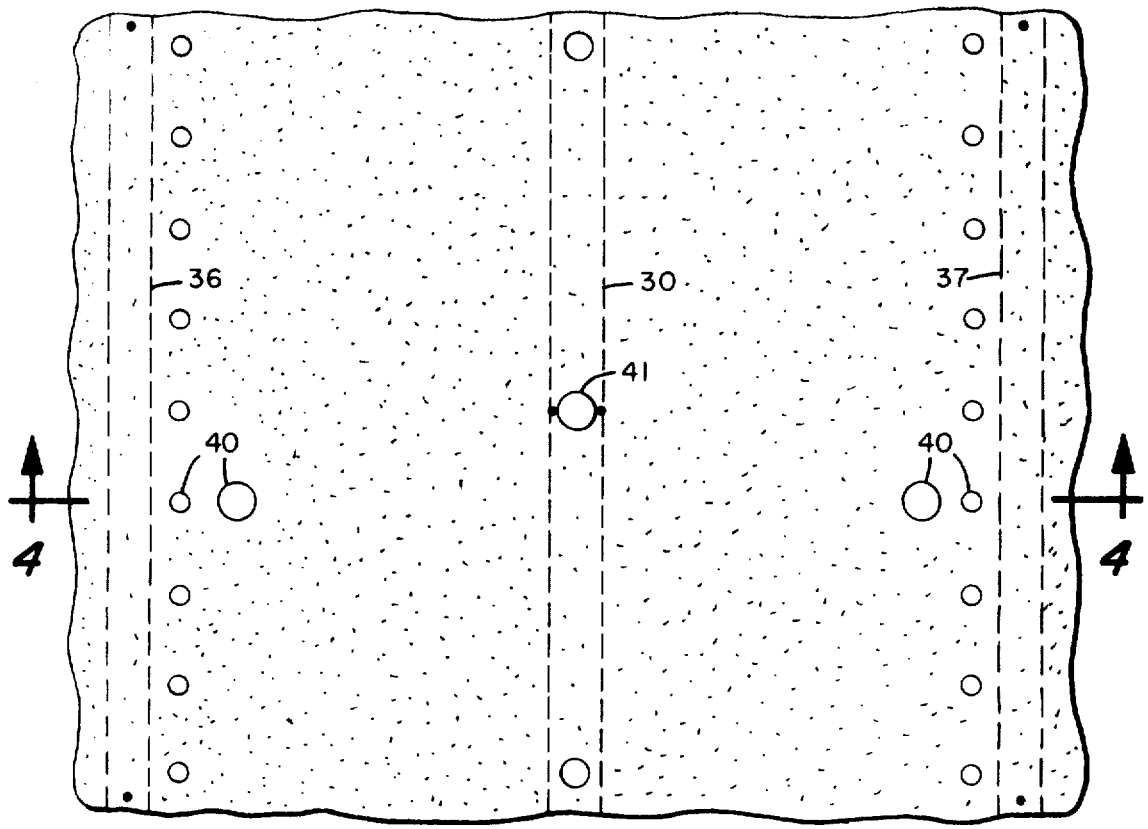
FIG. 3 is a top plan view of a modified system of the present invention employing a drain field for disposal of aqueous fluid effluent.
Figure 4:
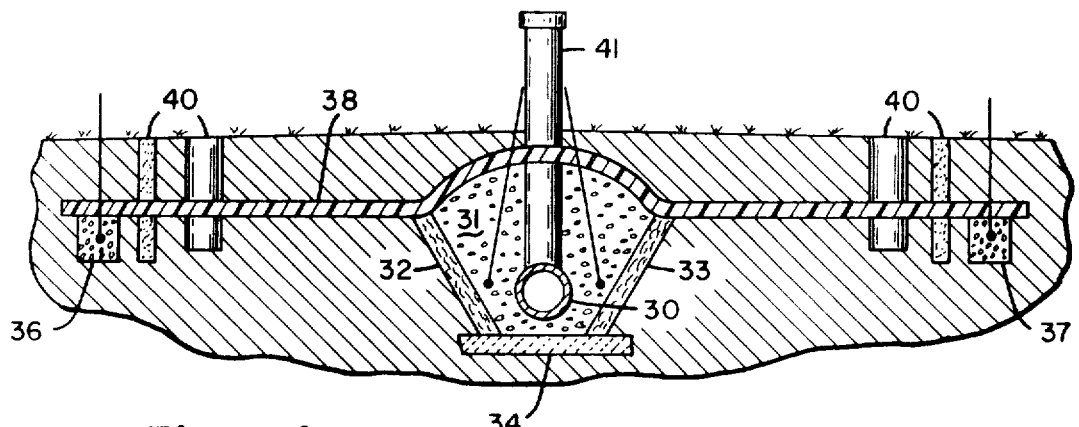
FIG. 4 is a vertical sectional view, partially subterranean in nature, and taken along the line and in the direction of the arrows 4—4 of FIG. 3.

Attention is now directed to FIGS. 3 and 4 of the drawings wherein a modified form of the invention is illustrated. A drain tile shown at 30 delivers effluent from a remotely disposed septic tank (not shown) into a disposal field buffer storage area 31. The walls of buffer storage area 31, such as at 32 and 33 are fabricated from a material forming the expendable anode of the present invention, such as, for example, scrap iron or the like. The base of the storage area 31, such as at 34, is preferably clay or concrete. A pair of laterally disposed non-expandable cathodes are provided as at 36 and 37, these cathodes preferably being fabricated from crushed coke, graphite, or mixtures thereof. A thermal insulation sheath, such as a film or layer of insulation material is provided, if needed, such as at 38, this insulation being utilized to assist in prevention of freezing of the system, and also to prevent the discharge or accumulation of surface water into the disposal area. Test bores, such as are illustrated at 40—40 may be employed, these bores being utilized to permit inspection of the system from time to time, and also to provide a means for discharge of entrained gases or the like, if present at the area adjacent the cathodes 36 and 37. Also, if desired, an inspection tube or housing 41 may be coupled to the drain tile member 30.

The function of the system shown in FIGS. 3 and 4 is substantially identical to that discussed in connection with FIGS. 1 and 2, the primary difference being the arrangement of the disposal field. The system of FIGS. 3 and 4 utilizes the conventional drain field, as distinguished from the dry-well system of FIGS. 1 and 2.

It has been indicated that the cathode is disposed at a distance from the discharge of effluent into the soil. The discharge of normal sewage from a family dwelling includes a substantial percentage of phosphates, these elements being present in most of the commonly utilized detergent, soaps, and the like. The phosphates, being anionic in nature, will, when under the influence of an electrical field, tend to migrate toward the anode. Therefore, the application of osmotic principles to the substance of this arrangement will enhance the ability of the water present in the effluent to move through the system and into the anode area as well. Thus, an electrolytic system is provided which supplies the energy required for the establishment of an electroosmotic system.

In the system as shown in FIGS. 1 and 2, the electrolytic cell established generates an electrical field having a potential in the range of between about 0.8 volt and 1.5 volts, depending upon the nature of the soil and the quantity of liquid present. This voltage can be measured along conductor 20.

As has been previously indicated, means may be provided for driving a direct current field through the system.

While the system disclosed herein has been discussed with application toward treatment of ground water, or sewage discharged into a subterranean or underground system, it is likewise adaptable toward treatment of polluted surface waters, the arrangement merely providing for the establishment of an electrical field across areas where sources of pollution may occur.

I claim:

1. Means for dispersing aqueous effluents from a sewage treatment system consisting of a generally closed septic tank and a disposal field, the arrangement comprising:
   (a) a generally closed septic tank vessel arranged to receive raw sewage and to retain solids and discharge aqueous fluid effluent therefrom;
   (b) a disposal field disposed adjacent said septic tank vessel and arranged to receive aqueous effluent from said septic tank vessel;
   (c) electrode means including an expendable anode situated in said disposal field and adjacent said septic tank vessel, and a generally non-expendable cathode situated within said disposal field remote from said septic tank vessel and said anode, and electrolytically coupled to said non-expendable cathode.

2. The system as defined in claim 1 being particularly characterized in that a plurality of cathodes are provided, the cathodes being arranged in spaced relationship one to another.

3. The system as defined in claim 1 being particularly characterized in that means are provided for impressing a direct current field through the electrolytic cell established between said anode and said cathode.

4. The system as defined in claim 1 being particularly characterized in that said non-expendable cathode consists essentially of carbon.

5. The system as defined in claim 4 being particularly characterized in that said expandable anode is comprised essentially of metallic iron.

6. The system as defined in claim 1 being particularly characterized in that said cathode consists essentially of crushed carbon, and said expendable anode consists essentially of finely divided particles of metallic iron.

7. Means for dispersing aqueous effluents from a sewage treatment system consisting of a generally closed septic tank and a disposal field, the arrangement comprising:
   (a) a generally closed septic tank vessel arranged to receive raw sewage and to retain solids and discharge aqueous fluid effluent therefrom;
   (b) a disposal field disposed adjacent said septic tank vessel and arranged to receive aqueous effluent from said septic tank vessel;
   (c) electrode means including an anode and a cathode, with at least one of said electrodes being disposed within said septic tank vessel, and means for applying an electrolytic potential between said electrodes.

References Cited

UNITED STATES PATENTS

| 2,211,696 | 8/1940 | Irons | 166—21 |
| 2,625,374 | 1/1953 | Neuman | 255—1.8 |
| 2,831,804 | 4/1958 | Collopy | 204—180 R X |
| 3,417,823 | 12/1968 | Faris | 166—45 |
| 3,506,562 | 4/1970 | Coackley | 204—300 |

JOHN H. MACK, Primary Examiner

A. C. PRESCOTT, Assistant Examiner

U.S. Cl. X.R.

204—180 R

UNITED STATES PATENT OFFICE
CERTIFICATE OF CORRECTION

Patent No. 3,647,667            Dated March 7, 1972

Inventor(s) Earl C. Peterson

It is certified that error appears in the above-identified patent and that said Letters Patent are hereby corrected as shown below:

Column 5, line 24, after "system.", insert -- In such an arrangement, a battery means such as the battery 42 may be employed in the system. --.

Signed and sealed this 4th day of July 1972.

(SEAL)
Attest:

EDWARD M. FLETCHER, JR.
Attesting Officer

ROBERT GOTTSCHALK
Commissioner of Patents